United States Patent [19]

Cailey et al.

[11] Patent Number: 4,881,633
[45] Date of Patent: Nov. 21, 1989

[54] MODULAR WORK INDEXING MACHINE AND METHOD OF CONSTRUCTING SUCH A MACHINE

[75] Inventors: Ronald J. Cailey, Flint; John F. Nichols, Essexville; Herman F. Heidtman, Bay City, all of Mich.

[73] Assignee: RWC, Inc., Bay City, Mich.

[21] Appl. No.: 101,399

[22] Filed: Sep. 28, 1987

[51] Int. Cl.$^4$ ............................................. B65G 21/20
[52] U.S. Cl. .................................... 198/345; 198/816; 198/851; 198/860.2
[58] Field of Search ............... 198/345, 346, 816, 851, 198/852, 858, 860.2; 414/750

[56] References Cited

U.S. PATENT DOCUMENTS

| | | | |
|---|---|---|---|
| 1,756,136 | 4/1930 | Ryther | 198/844 |
| 3,379,298 | 4/1968 | Willis | 198/345 |
| 3,643,792 | 2/1972 | Resener | 198/844 X |
| 3,934,701 | 1/1976 | Mooney et al. | 198/345 |
| 3,967,721 | 7/1976 | Rhoden | 198/844 X |
| 4,096,943 | 6/1978 | Gentsch | 198/851 X |
| 4,301,915 | 11/1981 | Michalik et al. | 198/851 |
| 4,706,796 | 11/1987 | Chambers | 198/345 |

Primary Examiner—Robert J. Spar
Assistant Examiner—Lyle K. Kimms
Attorney, Agent, or Firm—Learman & McCulloch

[57] ABSTRACT

A precision indexing conveyor for moving workpieces incrementally along a longitudinal pathway from work station to work station, has a pair of in-line sprockets provided at opposite ends of a frame. An endless conveyor, comprising longitudinally spaced apart workpiece carriers mounting on a series of prestretched equal length, flexible, spirally wound cable links having precisely longitudinally spaced apart, rigid pins fixed to their ends at locations such as to provide a common cable length at a time when the cables are all under a predetermined common tensile load, is trained around the sprockets. A drive drives the conveyor in increments of revolution punctuated by periods of dwell sufficient for a work operation to be performed at the work stations and the mechanism maintains a predetermined tensile load on the conveyor substantially equal to the load applied to the cables when the pins are fixed thereto. The workpiece carriers are disclosed as including platens and work support plates which are joined to the platens in a manner to provide a longitudinal float to permit shot pins to seek a precise location.

13 Claims, 5 Drawing Sheets

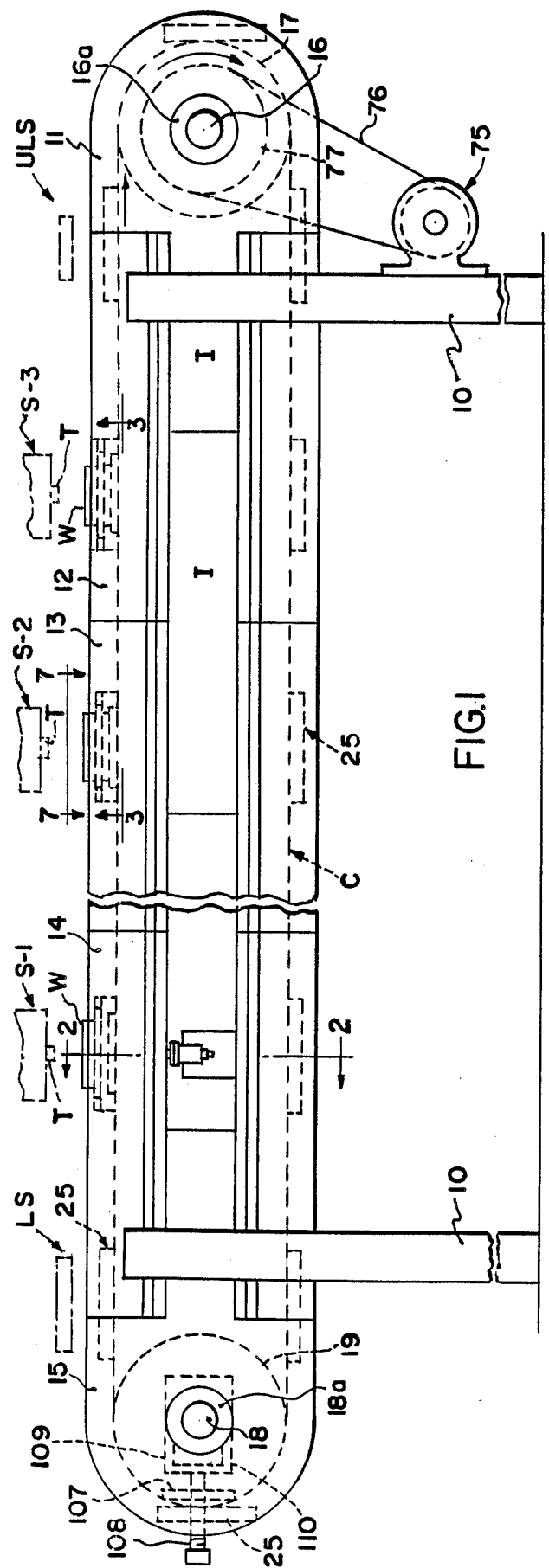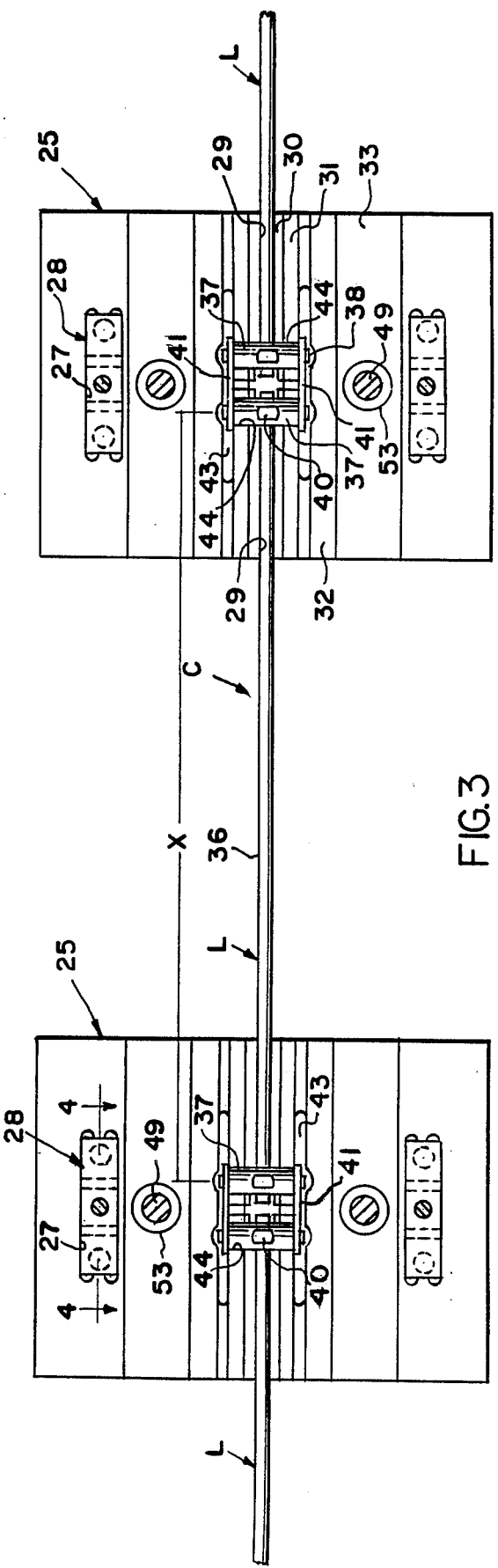
FIG.1
FIG.3

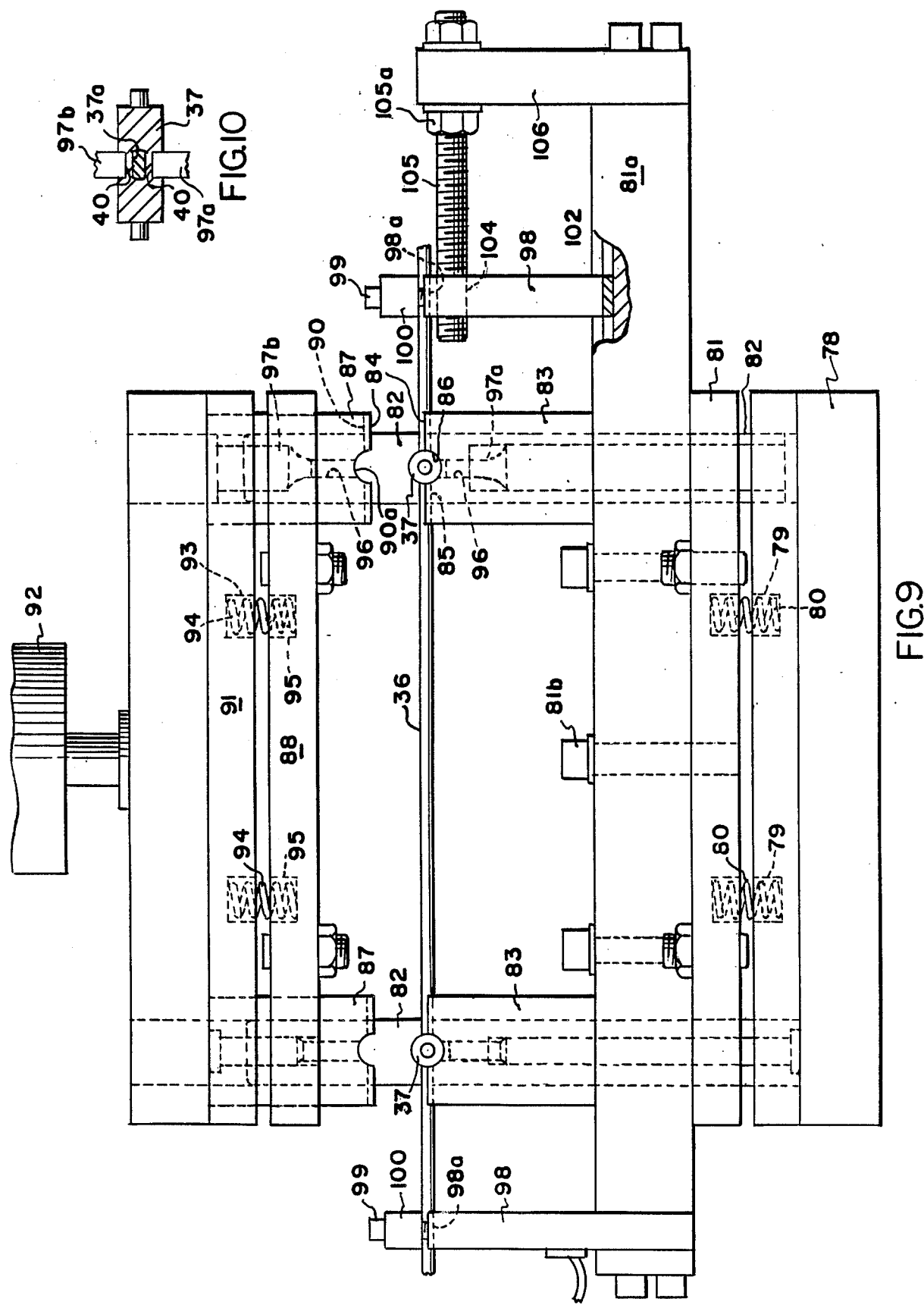

MODULAR WORK INDEXING MACHINE AND METHOD OF CONSTRUCTING SUCH A MACHINE

BACKGROUND OF THE INVENTION

This invention relates to endless workpiece indexing machines for delivering workpieces in a linear path to successive work stations in a positive and precise manner, and more particularly to a work transfer system utilizing a plurality of work support platens or carriers, mounted on a segmental endless conveyor, which are moved from work station to work station to permit successive manufacturing steps to be performed in an automated manufacturing system.

The steps which are performed at the work stations are typically assembly and component coupling steps, but may, of course, include a wide variety of manufacturing operations including operations wherein robots are used at designated stations to deliver parts or perform operations. Other station functions may include machining, inspection, and packaging. One of the essential requirements for such a system is precise location of the workpieces at the work stations, but this requirement has normally increased the costs of building such a system significantly. The present invention, which has particular application for small parts assembly, is a low cost—high performance system for the rapid assembly and inspection of a wide variety of products.

SUMMARY OF THE INVENTION

The invention provides a work indexing system and method of making a system which is modular in character, and, thus, has the capability of being adapted to first one small parts assembly operation, and then another, where a different number of modules are required. The system employs a modular frame with a pair of in-line sprockets at opposite ends of the frame, and an endless conveyor trained around the sprockets which is made up of longitudinally spaced apart plastic platens mounted on a series of equal length, flexible, wound cable links having precisely longitudinally spaced apart pins fixed to their ends, in a manner such as to provide precisely uniform link lengths. Mechanism for maintaining a predetermined tensile load on the overall conveyor, essentially equal to the load applied to the cables at the time the pins are fixed thereto ensures precise indexing. The cable links disclosed have pins at each of their ends which are coupled by rigid roller chain links releasably carried by the plastic carrier plates to ensure that the plastic platens are not deformed by the tensile load applied.

In addition, at those stations where shot pins need to be employed to even more precisely locate the workpiece and maintain it in this position during the work performing operation, mechanism is provided for permitting a longitudinal limited movement of the work mounting plates carried by the plastic platens.

One of the prime objects of the present invention is to provide an economically produced system, capable of utilizing low cost materials in its construction without sacrificing the precision and speed which is necessary to modern day, small parts assembly operations.

Still another object of the invention is to provide a high performance system of the character described which can handle a wide variety of products of a size, for instance, to fit within a 6×6×12 inch volume, and wherein the parts weigh under twenty pounds.

Still another object of the invention is to provide a system of the type described, wherein the synchronous indexing utilized can be accomplished rapidly, (for example, in less than one second where required) and provides a predictable production output rate.

Another object of the invention is to provide accurate shot pinning positioning at some work stations by providing some longitudinal axial adjustment of the indexed position of the workpiece carrier relative to its platen.

Still another object of the invention is to provide a system which facilitates in-line part placement, and easy and convenient operator access to all line functions.

Still a further object of the invention is to provide a reliable system, useable in either over and under or carousel orientation, which can achieve up to a ninety percent labor reduction in product assembly, while facilitating good quality control wherein the inspection and removal of sub-standard assemblies is enhanced to ensure high quality levels.

Still another object of the invention is to provide a system having a limited movement for the work supporting plates which compensates for changes caused by wear during use, and does not require the use or replacement of unduly expensive conveyors and conveyor indexing equipment.

Other objects and advantages of the invention will be pointed out specifically or will become apparent from the following description when it is considered in conjunction with the appended claims and the accompanying drawings.

DESCRIPTION OF THE DRAWINGS

FIG. 1 is a somewhat schematic, side elevational view of the indexing conveyor system;

FIG. 3 is a greatly enlarged, under plan view, taken on the line 3—3 of FIG. 1;

FIG. 9 is a partly sectional, schematic, side elevational view illustrating a method of manufacturing the cable links;

FIG. 10 is an enlarged, fragmentary view showing mechanism for securing the pins to the cable ends;

FIG. 12 is an enlarged, fragmentary view illustrating the manner in which air under pressure is supplied to operate a cylinder or the like.

GENERAL DESCRIPTION

Figure 2:
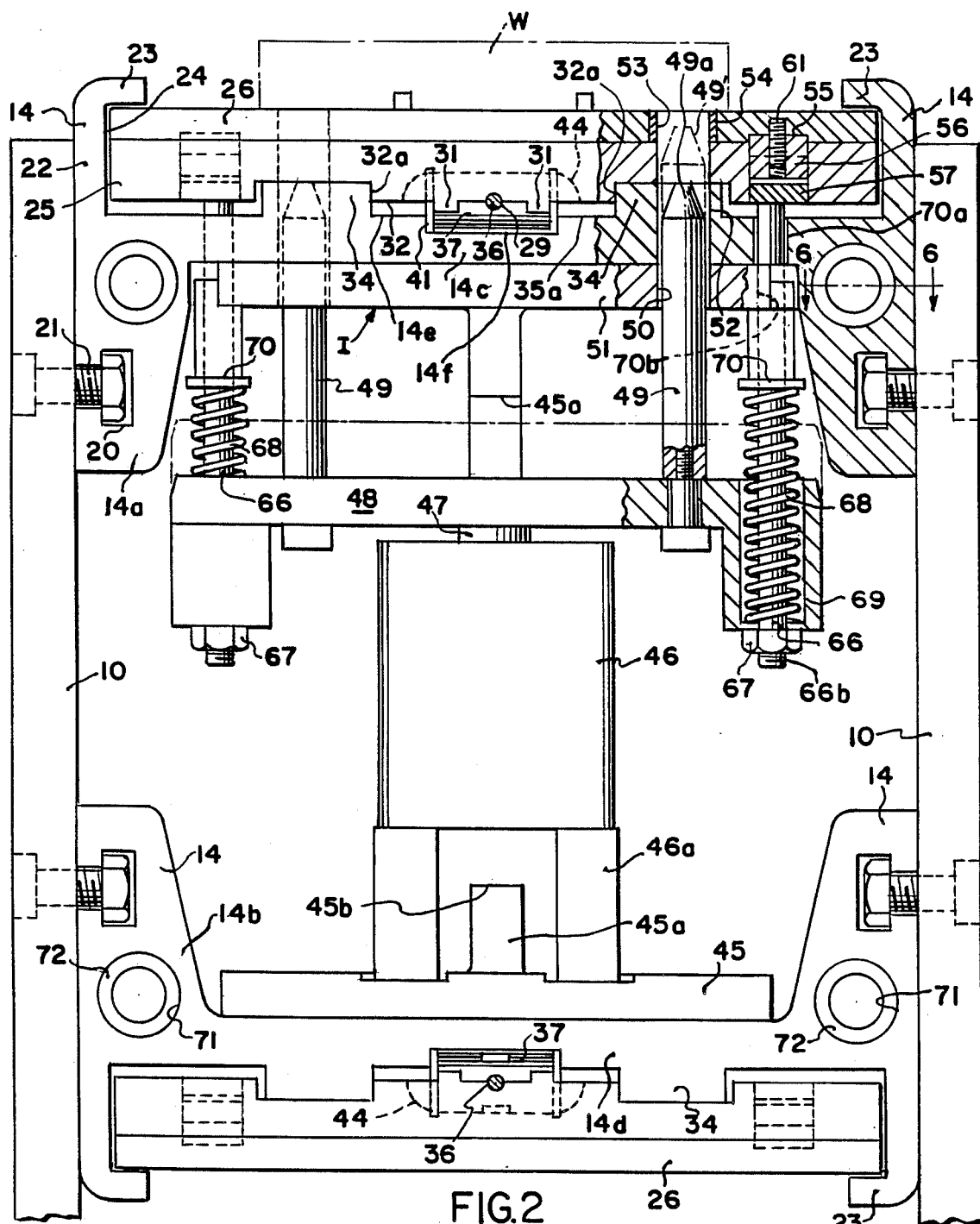
FIG. 2 is a greatly enlarged, cross-sectional view taken on the line 2—2 of FIG. 1.

A typical indexing conveyor structure manufactured according to the invention may be supported on pairs of laterally spaced legs or pedestals 10. While only two pairs of end legs are illustrated, it is to be understood that as many sets of legs can be used as are necessary to support the modules of this modular conveyor system.

The structure depicted, for the sake of simplicity, includes only a drive end, front module frame 11, a series of intermediate module frames 12, 13 and 14, and a rear end module frame 15. The number of intermediate modules utilized will, of course, depend upon the number of work stations which, in FIG. 1, are schematically indicated and identified by the letters S-1, S-2, and S-3. Tools T of various types may be provided at the work stations. Since the tools are of conventional form, they have been, also, indicated only schematically.

Provided in the front module 11 are suitable fixed bearings 16a for supporting a conveyor front shaft 16, on which a conveyor drive sprocket 17 is fixed, and similarly the rear module frame 15 has bearings 18a for supporting a rear conveyor shaft 18 on which a rear sprocket 19 is fixed. A cross-sectional configuration of the sprockets 17 and 19, which may be formed partly of steel and partly of a light-weight aluminum alloy is fragmentarily disclosed in FIG. 11.

As FIG. 2 notes, the module generally designated 14, and also the other modules (which are all of similar construction and will need not be specifically repetitively described), each comprise upper and lower extruded aluminum frame members 14a and 14b, having accessible T-slots 20 permitting them to be secured by bolt and nut assemblies 21 to the support posts 10. The members 14a and 14b, which are identical, except that the member 14b is inversely disposed, includes a projecting wall 22, with an inwardly turned flange 23, these members on each of the modules providing a guideway 24 for a series of plastic carrier plates or platens 25, and the steel plates 26 which are carried thereby and mount workpieces or the like W. The plastic plates 25 may be injection molded of "delrin" plastic or another hard and long-wearing polymer of a rigid nature such as nylon. The frame members 14a and 14b are fixed to the opposite flanges of extruded aluminum I beams which are supported in formation in the modules, as shown in FIG. 1, so as to span adjoining modules in a lap joint and provide adequate beam strength.

Figure 11:
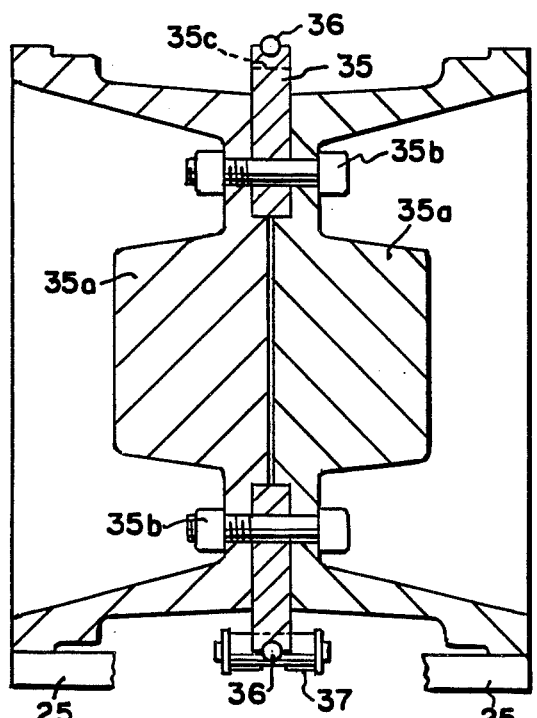
FIG. 11 is an enlarged, fragmentary view illustrating the construction of the conveyor sprockets.

The configuration of the under surfaces of the identical carrier plates 25 is particularly disclosed in FIGS. 2 and 3, as providing openings or pockets 27 for insert assemblies, generally designated 28, which will later be described. Transversely centrally, the platens 25 are provided with a pair of aligned longitudinal grooves 29, extending from a central location to each end of the platen. The grooves 29 are situated in recessed portions 30. Flanking the recessed portions 30, are protruding longitudinal walls 31, recessed longitudinal wall portions 32, and still further recessed way portions 33, all of which extend longitudinally from one end of the plate 25 to the other. The recessed portions 33 are provided to particularly fit the projecting portions 34, provided on the connecting web portions 14c and 14d of frame sections 14, the central portions of webs 14c and 14d being cut away as at 14e and 14f, so that the plate 25 amply clears them. The center-to-center wall distance between walls 32a is a critically held dimension. The sprockets 17 and 19 are similarly configured as shown in FIG. 11 and preferably comprise a conveyor supporting steel ring 35 clamped between aluminum sides 35a by bolts 35b. Ring 35 has precisely spaced pairs of side-by-side sockets 35c for a purpose which later will be described.

The carriers 25 mount to an endless conveyor link structure, of an inexpensively constructed nature, which is especially prepared to provide precision indexing. As FIGS. 3–5 particularly indicate, the conveyor structure, generally designated C, is comprised of a series of coupled, equal length cable links, generally designated L, each of which is comprised of a twisted, multi-strand length of steel aircraft cable 36, joined at each end to cylindrical pins 37 which have axially projecting, reduced diameter, pin ends 38. The pins 37 are each provided with transversely and axially central openings or bores 39 to receive the projecting ends of the cable 36. Then each pin 37 is crushed in or swaged as at 40 from opposite sides, as shown in FIG. 10, to deform the walls of the bores 39, and firmly and rigidly clamp them to the ends of cable 36. It is essential that the cable portions of each link L between the axes of pins 37, be identical in length, and the manner in which this is accomplished will be later disclosed. It is sufficient to understand at this point that the pins 37 are swaged to the cable 36 at a time when the cable is stretched under a predetermined tension, and that, when the conveyor is in operation, each of the cable portions 36 is maintained under that same, or substantially the same, tension load.

Figure 4:
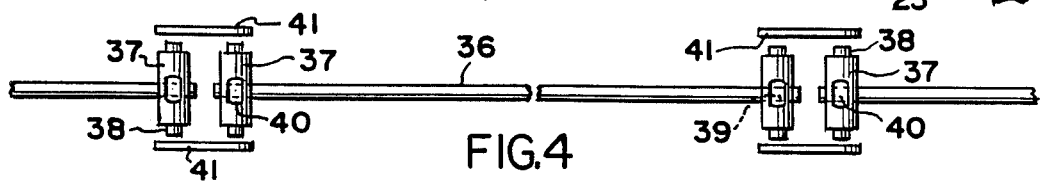
FIG. 4 is an enlarged, exploded, under plan view of the conveyor link structure only.
Figure 5:
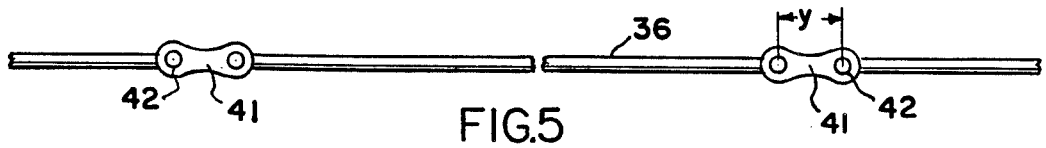
FIG. 5 is a fragmentary, side elevational view thereof.

As FIG. 3–5 particularly indicate, the cable links L are coupled in end-to-end relationship by conventional, commercially available, roller chain links 41, having precisely spaced-apart bore openings 42 for receiving the ends 38 of the pins 37. Provided within the wall surfaces 32 of the platens 25, adjacent the ribs 31, are grooves 43 which receive the roller links 41 and protruding pin ends 38, and hold the links 41 laterally in position on ends 38. Provided in the under surface of the platen 25 to receive the pins 37, are transversely extending, substantially semi-cylindrical sockets 44 which span the wall portions 30 and 31, as shown. Each of the plates 25 has a pair of the precisely spaced apart pockets or sockets 44, and the pins 37 are a tight, snap-fit therein, so as to retain the assembly in position within each plate, with the cable link 36 being accommodated in the central, axial grooves 29.

FIG. 2 discloses a frame mounted shot pin device, which is used in each module where shot pinning is required to precisely locate the workpiece W, with an even greater precision. While the device could be hung from frame portions 14a, here, the I beam bottom flange 45 supports an air cylinder 46 which has a piston rod 47 on which a yoke 48 is fixed. The I beam web 45a is cut away as at 45b to receive a pedestal 46a on which the cylinder 46 is fixed. It will be seen that yoke 48 mounts a pair of shot pins 49 which extend up through bores 50 provided in the upper flange 51 of the frame I beam I, and openings 52 provided in projecting portion 34. It will be noted that the upper end of each of the shot pins 49 is frustoconically configured as at 49a, and that, when the shot pins are in extended position, they are adapted to extend up into openings 53, provided in the plastic carrier plate 25, and shot pin bushing openings 54 provided in the workpiece support steel plates 26.

The plates 26 are coupled to the platen plates 25 in a manner to provide a very limited longitudinal shiftability or movement relative to carrier plates 25, while restricting other relative movement. As FIG. 8 particularly indicates, the steel plates 26 have openings 55 provided to receive wedge-shaped blocks 56 which project downwardly into recesses R provided in the plastic carrier plates 25 to accommodate the actuator insert assemblies 28. The assemblies 28 each include a plate 57 having a pair of spring wells 58 flanking a wedge-shaped opening 59 which receives the wedge block 56 which is secured to steel plate 26 by a countersunk screw member 61.

Figure 8:
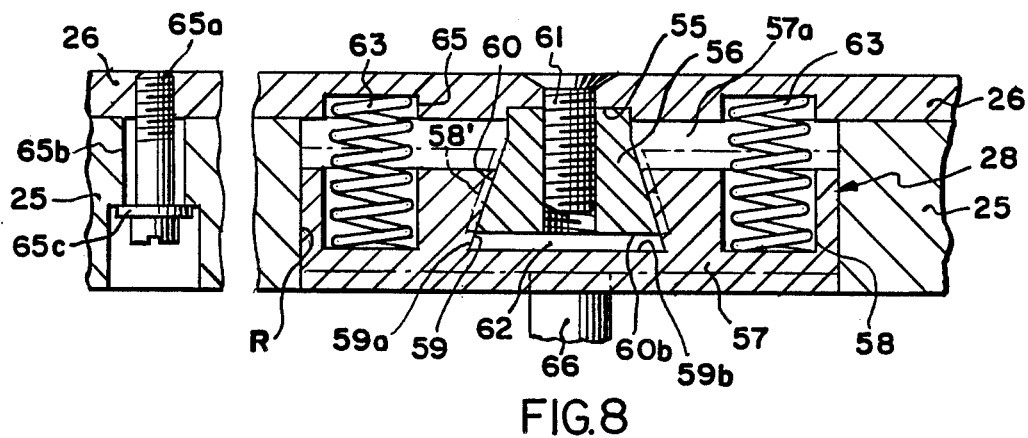
FIG. 8 is a greatly enlarged, sectional elevational view, illustrating the manner in which the workpiece support plate is coupled to the carrier platen in a manner to provide longitudinal movement at a station where shot pin positioning of the workpieces is required.
Figure 7:
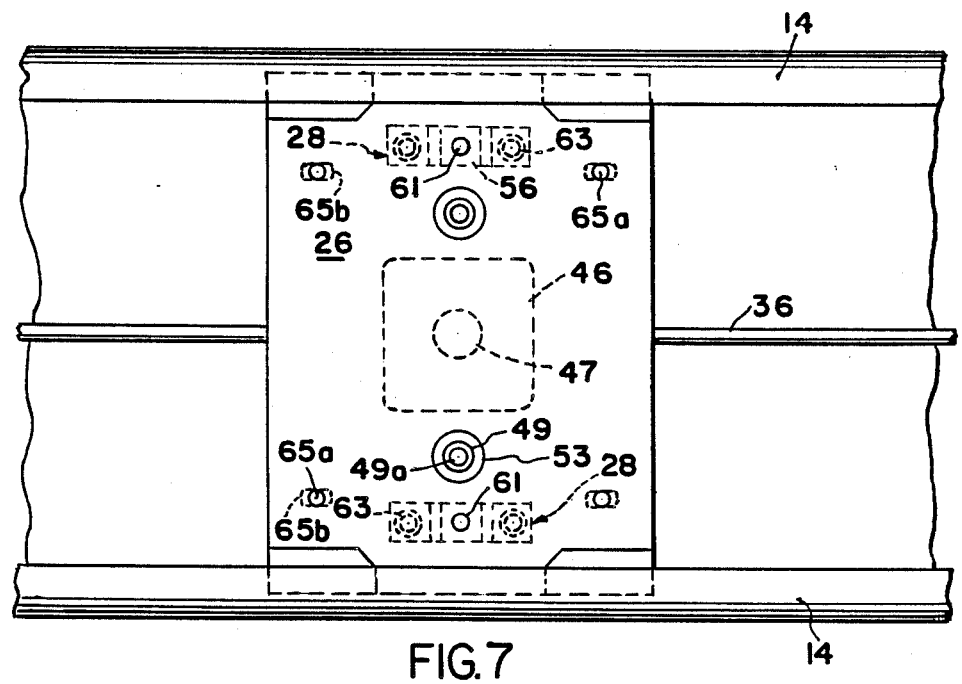
FIG. 7 is a considerably enlarged, top plan view taken on the line 7—7 of FIG. 1.

The longitudinally opposite sides 60a of the block 56, and 59a of the opening 59, are angularly complementary and, in the FIG. 8 position, have substantially zero clearance between them so that there is no relative longitudinal play possible. The bottom face 60b of the block 56 is normally spaced as at 62 from the bottom face 59b of the wedge-shaped opening 59, and is normally held in the FIG. 8 position in which a space 57a is provided between the steel plate 26 and actuator member 57 by the springs 63, provided in the spring wells 58 on opposite sides of the opening 59, which extend up into spring wells 65 provided in the vertically fixed steel plate 26.

If the plate 57 is moved upwardly to the broken line position indicated at 58' in FIG. 8, a clearance of about forty-thousandths of an inch is provided at opposite sides of the wedge block 56 to permit a limited longitudinal movement of the steel plate 26 and the workpiece relative to the platen carrier plate 25. Thus, the shot pins 49, with the pilot ends 49a, will be able to seek the shot pin openings 53 provided in the steel plate 26 to provide a more precise location of the workpiece.

The steel plates 26 are prevented from moving upwardly with the actuator members 57 by screws 65a, which extend upwardly through longitudinally enlarged openings 65b in the platens 25 to thread into the steel plates 26. The head of each screw 65a engages a washer 65c, as shown in FIG. 8 and the screws 65a clearly can move in openings 65b and do not interfere with the limited longitudinal movement permitted steel plates 26.

Referring now to FIG. 2, each wedge plate 57 is pushed upwardly by the pins 66, carried by the yoke 48 at each shot pin station. Each pin 66 is threaded as at 66b to be secured to the yoke 48 by a nut 67, and a coil spring 68 is provided in a spring well 69 in the yoke 48, in engagement with a collar 70 provided on each pin 66. Suitable openings 70a and 70b are provided in the I beam flange 51 and frame plate 14, to permit the pins 70 to move upwardly when double acting cylinder 46 is operated to move the yoke 48 and pins 66 upwardly to push or cam the actuator blocks 57 upwardly, at the time an index of movement has been completed and the carrier platen 25 reaches a shot pin controlled work station. Springs 63 are weaker than the springs 68, so the members 57 first bottom out by engaging plates 26, after which springs 68 take up further upward movement of yoke 48 while shot pins 49 are moving into openings 53.

It will be noted that openings or bores 71 are provided in the frame members 14a and 14b to extend from one end thereof to the other. These openings are shouldered near their entrance ends to receive tubular sleeves 72 which have a dual function. Grooves 73, provided in the outer circumference of each sleeve 72, accommodate bore-sealing, rubber O-rings 74. The sleeves 72 function as removable dowels which maintain the various module frame sections 11-15 in alignment and in an endwise abutment, while permitting the passage of air under pressure from a suitable compressor line from one frame module to another.

The motor drive mechanism 75, which is indicated schematically in FIG. 1, may comprise a suitable electric motor driven Geneva mechanism for providing indexing motions to the shaft 16, suitable to move the sprocket 17 in typically 180° indexing movements, and move the carrier plates 25 from station-to-station successively. To accomplish this, the drive is transmitted from the indexing drive mechanism 75, via a precision timing belt 76 to a sprocket 77 fixed to shaft 16. As FIG. 11 discloses, the adjacent pins 37 of adjacent links 6 are received in the adjacent sockets 43a provided in ring 35 as the conveyor C passes around sprockets 17 and 19.

In FIG. 9, we have schematically disclosed mechanism for fixing the pins 37 to the three-sixteenths inch diameter stainless steel cable (36) ends. In practice, the typical 7×19 cable (7 spirally interwoven bundles of 19 wires each) is first pre-stretched under a tension load of about 2,000 pounds to cause a better internesting of the helically wound strands. Then, after much of the tension is relieved and while the cable 36 is still under a tension load of 300 pounds, the pins 37 are swaged to its ends.

FIG. 9 discloses a base 78, with wells 79 for springs 80, on which a die table 81 is resiliently supported. Table 81, which has a table extension portion 81a bolted to it as at 81b, is mounted for vertical sliding movement on guide posts 82 supported on the base 78. It will be noted that table 81 mounts die pedestals 83 formed with configured upper die faces 84, comprising central grooves 85 for receiving a cable length 36, and lateral recesses 86 for receiving the pins 37.

Provided directly above the die members 83, are die members 87 fixed to a table 88, which also is mounted for vertical sliding movement on posts 82, die members 87 also having the central grooves 90 for the cable 36 and the recesses 90a for enclosing the pins 37. Upper platen 91, which supports table 88 and may be driven by a suitable drive such as a hydraulic cylinder 92, for example, is provided with spring wells 93 mounting the springs 94, which extend also into spring wells 95 provided in member 88. The platen 91 is similarly vertically slidable on the guide posts 82.

It will be noted that each of the recessed portions 86 and 90a have bores 96 communicating with them, the bores 96 housing swaging pins 97a and 97b, which engage opposite sides of each of the pins 37 during the press stroke, to indent the pin sides as at 37a and cause them to deform and tightly grip the cable. The upper ends of the upper pins 97b are fixed to platen 91, and the lower ends of lower pins 97a are fixed to the base 78. In operation, as platen 91 descends, the dies 84 and 87 first engage the pins 37 and then, as the springs 80 and 94 compress with further downward movement of platen 91, the swaging pins 97a and 97b have relative movement with the pin supports 83 and 87 to perform the swaging operation.

Provided to grip the ends of the cable are pedestal clamps 98 with cable accomodating grooves 98a and clamp bolts 99 which force clamp caps 100 down upon the cable ends to hold them tightly. The right end pedestal in FIG. 9 is shown as mounted on a slide or way 102. The right end pedestal is threaded as at 104 to receive a take-up screw 105 secured to end wall support 106, as shown, nut 105a being backed off when screw 105 is adjusted. It is the screw 105 which, when manipulated prior to the swaging operation, first applies the 2,000 pounds of pressure, and then can be backed off until cable 36 is under a load of 300 pounds of tension. It is in this condition that the dies 87 are forced downwardly, and the pins 97 oppositely squeeze and indent the rollers 37. The strain gauge SG connected to the left pedestal 98 operates a known electronic meter which digitally indicates the exact tension load applied.

Referring now more particularly to FIG. 1, a support plate 107, is shown as spanning the sides of the rear connected frame units 14a and 14b which make up modular frame component 15. Support 107 is threaded to receive a take-up screw 108, which has its end fixed to a yoke 109, yoke 109 having end walls 110 supporting the bearings 18a which mount shaft 18 and sprocket 19. By manipulating take-up screw 108, and moving the yoke 110 and thereby shaft 18 and sprocket 19 rearwardly, the entire conveyor C is placed under a tension load of 300 pounds. Thus, the load on each link L is 300 pounds and matches the load applied to each cable 36 at the time the pins 37 were swaged to its ends to provide a precise distance, i.e., 12 inches, between platens 25. With wear over periods of extended use tending to stretch the cables 36, the take-up screw 108 makes it possible to maintain this precise spacing.

Figure 6:
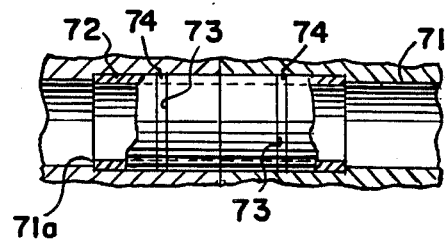
FIG. 6 is a fragmentary, sectional plan view taken on the line 6—6 of FIG. 2.
Figure 12:
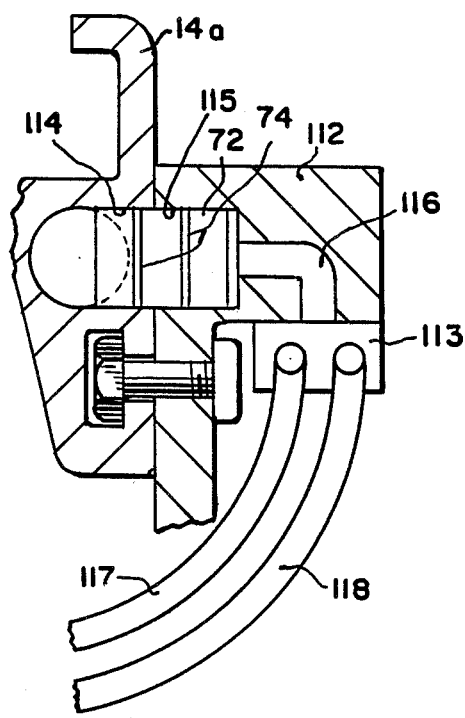

In FIG. 12, mechanism for controlling the admission of air to the cylinder 46 is illustrated, and comprises a valve mounting plate or hanger 112, which mounts one or more stackable solenoid valves 113. An opening 114 is bored in the frame member 14a or 14b, as the case may be, and communicates with an opening 115 provided in the hanger 112. A dowel member 72, identical to the dowel member shown in FIG. 6, and provided with the sealing O-rings 74, is inserted in position as shown. The opening 115 communicates through sleeve dowel 72 with an opening 116 leading to solenoid valve 113, and air lines 117 and 118 are then provided t lead over to cylinder 46 to admit air to one end or the other of cylinder 46, while exiting it from the opposite end in the usual manner.

THE OPERATION

In operation, as the cam or Geneva drive 75 transmits motion to drive belt 76, the sprocket 17 will be turned through enough of a partial revolution (typically one-half) to advance a workpiece from station S-1 to station S-2, and a second workpiece from station S-2 to station S-3. At the same time, a new workpiece, or the like is loaded at the loading station LS, and clamped in position to a plate 26, via a suitable fixture, while a finished workpiece is advanced from station S-3 to front station ULS for unloading. The length of index is precisely twelve inches. This indexing motion will be precise because the center-to-center distance y between chain link bores 42 is precisely three-fourths of an inch while the length x of the cables 36 between the axes of pins 37, is exactly eleven and one-fourth inches under the 300 pound tension load applied to each cable 36 by adjustable sprocket 19.

It is to be understood that normally more intermediate module sections 12–14 are employed to perform the variety of assembly and machining operations which are necessary. When a particular assembly operation is to utilize more, or fewer, intermediate stations, the length of conveyor C is adjusted accordingly by simply adding or eliminating links L and carrier platens 25. For this purpose the links 41 are readily removable and recoupleable.

When a particular platen 25 is indexed to a control station, the conventional programmable controller, which is employed, electrically energizes valve 113 to move the cylinder yoke 48 upwardly. This moves shot pins 49 upwardly into the openings 53 provided in the steel plate 26. Because of the pilot ends 49a, the circumferential portions of pins 49 do not immediately engage the walls of bores 53. The actuator plate operating pins 70 also move upwardly with yoke 48, and move the actuator plates 57 upwardly to the position shown at 58' to release the steel plate 26 for possible longitudinal float, prior to the time the pilot portions 49a move upwardly far enough so that the maximum diameter portion of pins 49 engage the walls of openings 54 (in the 49' position). Once the work operation has been performed and the conveyor system C is ready for indexing movement once again, the programmable controller operates valve 113 to return the yoke 48 and pins 49 and 66 to the FIG. 2 position.

While the embodiments of the invention have been described in detail, it will be apparent to those skilled in the art that the disclosed embodiments may be modified. Therefore, the foregoing description in all aspects is to be considered exemplary rather than limiting in any way, and the true scope of the invention is that defined in the following claims.

What is claimed is:

1. In a precision indexing conveyor system for moving workpieces incrementally along a longitudinal pathway from work station to work station:
    a. a frame;
    b. a pair of in-line sprockets at opposite ends of said frame;
    c. an endless conveyor trained around said sprockets comprising longitudinally spaced apart workpiece carriers mounting on a series of prestretched equal length, flexible, spirally wound cable links having precisely longitudinally spaced apart, rigid pins fixed to their ends at locations such as to provide a common cable length at a time when the cables are all under a predetermined common tensile load;
    d. a drive for driving said conveyor sprockets in increments of revolution punctuated by periods of dwell sufficient for a work operation to be performed at the work stations;
    e. mechanism maintaining a predetermined tensile load on said conveyor substantially equal to the load applied to the cables when the pins are fixed thereto;
    f. said carriers having longitudinally central, transversely elongate, longitudinally adjacent sockets for receiving the adjacent pins on adjacent cable links; and
    g. the adjacent pins on adjacent cable links being connected by rigid roller chain links, and said carriers having transversely spaced grooves for accommodating said roller chain links.

2. The system of claim 1 wherein said carriers include rigid plastic plates with longitudinal grooves for accommodating the cable lengths, leading from the edges of said plates to said sockets.

3. The system of claim 2 wherein said plastic plates mount workpiece locator plates having shot pin receiving, locating openings therein; shot pins are provided on said frame at at least one of said work stations; means is provided for moving said shot pins to and from engaged positions in said openings; means is provided for securing said locator plates to said plastic plates in longitudinally fixed position; latter said means including an actuator member carried by each plastic plate and operable to release said locator plates for limited longitudinal movement with respect to said plastic plates; and means is provided on said frame at said one of said work stations for operating said actuator member to release said locator plates prior to the time said shot pins are operatively engaged in the shot pin receiving openings.

4. The system of claim 3 wherein said actuator member has a wedge-shaped opening with inclined longitudinal sides providing a wedge configuration of increasing dimension and a wedge block fixed to depend from said locator plate has complementary longitudinal sides and a outer wall normally spaced a clearance distance from said actuator member such that when the actuator member is in one position a longitudinal clearance is provided between the longitudinal walls of said wedge-shaped opening and said wedge block; and means is provided for maintaining said actuator member in a position in which said longitudinal walls are in engagement.

5. The system of claim 4 wherein said means for operating said actuator member comprises operating pin means at said one work station actuable to engage said actuator member and move it inwardly.

6. The system of claim 5 wherein common means drives said shot pins and operating pin means.

7. The system of claim 6 wherein said common means comprises a fluid pressure operated cylinder having an extensible yoke mounting said shot pins and operating pin means.

8. The system of claim 7 wherein said shot pins are configured such as to be received in engaged positions in said shot pin receiving locating openings only after said extensible pin means have operated said actuator members to release said locator plates for limited longitudinal movement.

9. In a precision indexing conveyor system for moving workpieces incrementally along a longitudinal pathway from work station to work station:
 a. a frame;
 b. a pair of in-line sprockets at opposite ends of said frame;
 c. an endless conveyor trained around said sprockets comprising longitudinally spaced apart platens mounting on a series of equal length conveyor links;
 d. a drive for driving said conveyor in increments of revolution punctutated by periods of dwell sufficient for a work operation to be performed at the work stations;
 e. workpiece locator plates carried by said platens and having shot pin locator openings therein;
 f. releasable means carried by said platens and locator plates for coupling the locator plates to the platens in a first position of longitudinally fixed relationship and in a second position in which limited longitudinal movement of the locator plates relative to the platens is provided;
 g. a shot pin device, situated at at least one work station, having a pin movable into and out of engaged position in a locator opening;
 h. means for operating said shot pin device to move the pin to said engaged position after a platen has arrived at said work station;
 i. an actuator operable to operate said releasable means and release the locator plate for limited longitudinal movement;
 j. means situated at said one work station engagable to operate said actuator before said pin is moved into said engaged position in said locator opening; and
 k. said conveyor links comprising a series of equal length, detachable, flexible, spirally wound cables having longitudinally spaced apart pins fixed to their ends; said carriers having adjacent sockets for receiving the adjacent pins on adjacent cable links, and the adjacent pins on adjacent cable links being connected by rigid roller chain links.

10. The system of claim 9 wherein the adjacent walls of adjacent sockets are axially grooved to provide flexibility in the sockets which are sized with respect to said pins to be spread thereby such that said pins are a frictional spring fit in said sockets and held by the deformed adjacent walls of said sockets.

11. The system of claim 9 wherein said releasable means includes an actuator member carried by each platen which has a wedge-shaped opening with inclined longitudinal sides, providing a wedge configuration of increasing dimension; there being a wedge block fixed to depend from said locator plate which has complementary longitudinal sides and a spanning wall normally spaced a clearance distance from said actuator member; and means is provided for normally maintaining the actuator member in a position in which said spanning wall is spaced from the actuator member and said longitudinal walls of the block and opening are in engagement.

12. The system of claim 11 wherein said means for operating said actuator member comprises operating pin means at said one work station actuable to engage said actuator member and move it to force it toward said block to create a longitudinal clearance between the longitudinal sides of said wedge-shaped opening and wedge block, and common means drives said shot pins and operating pin means.

13. The system of claim 12 wherein said common means comprises a fluid pressure operated cylinder having an extensible yoke mounting both said shot pin and operating pin means, and said shot pin is configured such as to be received in engaged position in said shot pin receiving location opening only after said extensible pin means has operated said actuator member to release said locator plate.

* * * * *